United States Patent
Tanaka et al.

[11] Patent Number: 5,890,457
[45] Date of Patent: *Apr. 6, 1999

[54] BOILER

[75] Inventors: Ryoichi Tanaka; Mamoru Matsuo; Yosuke Kataoka; Hitoshi Yahara, all of Yokohama, Japan

[73] Assignee: Nippon Furnace Kogyo Kabushiki Kaisha, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 585,454

[22] Filed: Jan. 16, 1996

Related U.S. Application Data

[60] Division of Ser. No. 544,562, Oct. 18, 1995, Pat. No. 5,626,104, which is a continuation-in-part of Ser. No. 199,205, Feb. 28, 1994, Pat. No. 5,522,348.

[30] Foreign Application Priority Data

Sep. 2, 1991 [JP] Japan .................................. 3-246505

[51] Int. Cl.⁶ .................................................. F22B 23/06
[52] U.S. Cl. ........................................ 122/367.1; 432/181
[58] Field of Search ...................... 432/179, 180, 432/181; 122/17, 367.1

[56] References Cited

U.S. PATENT DOCUMENTS

| | | | |
|---|---|---|---|
| 4,829,703 | 5/1989 | Watson et al. | 432/181 |
| 4,838,782 | 6/1989 | Wills | 432/181 |
| 4,870,947 | 10/1989 | Kawamoto | 432/181 |
| 4,923,391 | 5/1990 | Gitman | 432/181 |
| 4,948,365 | 8/1990 | Yuen | 432/112 |
| 5,049,064 | 9/1991 | Wills | 432/181 |
| 5,057,010 | 10/1991 | Tsai | 432/179 |
| 5,304,059 | 4/1994 | Tanaka et al. | 432/209 |

FOREIGN PATENT DOCUMENTS 8705988 10/1987 WIPO.

Primary Examiner—Mark H. Parshall
Assistant Examiner—Jiping Lu
Attorney, Agent, or Firm—Notaro & Michalos P.C.

[57] ABSTRACT

A boiler is provided with a radiation heat transfer section in its combustion chamber, which has therein, at least one regenerative-heating burner system including a pair of burners each with a regenerative bed. The burners receive combustion air and exhaust combustion gas which passes through the regenerative beds. Combustion is alternately effected in one of the burners and combustion gas is passed into the other burner, and exhausted through the corresponding regenerative bed of this other burner. Surplus thermal energy which is not completely consumed in the radiation heat transfer section is recovered in the regenerative bed. Combustion air than passes through the heated regenerative bed to heat the air. The boiler temperature is kept flat across the boiler. That is, the temperature is kept almost constant across the combustion chamber. This is done by maintaining a high rate of forced supply of more than 60 m/s for the combustion air. Also, the combustion air is heated to above the ignition point of the fuel, that is, about 800° C. These two factors increases thermal efficiency while reducing $NO_x$ emissions.

11 Claims, 21 Drawing Sheets

29 30 29 hot water
28
30
29
cold water
2
3

29
2
3
3
2
29

30
29
2 superheated steam the heat absorption of the boiler in the radiation heat transfer section 101 is changeable extraordinarily, which does not provide a uniform heating of a boiler water flowing in the water tubes or which may become full of steam. To prevent this problem, it is necessary to insure the circulation of the boiler water, and therefore, another problem is posed: The dispositions of heat transfer tubings are limited, and a pump and power are required for executing a forced circulation of the boiler water that need more initial and running cost.

BOILER

CROSS REFERENCE TO RELATED APPLICATION

This application is a division of application Ser. No. 08/544,562, filed Oct. 18, 1995, and now U.S. Pat. No. 5,626,104 which is a continuation-in-part application of Ser. No. 08/199,205 filed Feb. 28, 1994, and now U.S. Pat. No. 5,522,348.

FIELD OF THE INVENTION

The present invention relates to a boiler, and in particular to an improvement of a combustion chamber in the boiler.

BACKGROUND ART

In general, most conventional boilers employ a one-directional-combustion-type heat transfer mechanism. An example of that boiler is, as shown in FIG. 23A, constructed such that a burner 104 is installed at one end of a combustion chamber, from which burner, a combustion gas is blown, and during discharge of the gas from another end of the same combustion chamber, a heat of the gas is transferred to water in the boiler tube by means of a radiation heat transfer and a convection heat transfer, to thereby generate steam. The combustion chamber is divided into a radiation heat transfer section 101 for providing radiation heat to the boiler water, and a convection heat transfer section 102 for providing convection heat to the boiler water. In the radiation heat transfer section 101, although both flame temperature and heat absorption of the boiler are high (see FIG. 23B), the heat from the combustion gas is not completely transferred to the boiler water, which thus requires installing the convection heat transfer section 102 at the downstream site in order to recover the combustion gas heat. In the absence of such convection heat transfer section 102, the temperature of the exhaust gas will increase, giving a bad influence on the environment and also lowering thermal efficiency.

There has been known a boiler of the type which superheats a saturated steam in a superheater section provided therein. For example, as shown in FIG. 24A, in this sort of boiler, a superheater section 103 is defined between a radiation heat transfer section 101 and a convection heat transfer section 102. With this arrangement, a saturated steam generated in both radiant and convection heat transfer sections 101, 102 is superheated in the superheater section 103 so as to obtain a superheated steam. Alternatively, as in FIG. 25A, some of boilers of this sort have the superheater section 103 defined behind the radiant and convection heat transfer sections 101, 102 so that a saturated steam generated therein is superheated at the extreme downstream end of the combustion gas path. In those boilers, a typical way to adjust a temperature required for the superheating is by providing a bypass which does not pass through a heat exchanger in the superheater section 103, thereby controlling the amount of combustion gas flowing through the superheater section 103, or by cooling the superheated steam by way of a heat exchange with the boiler water and the like or by means of a cooling water being sprayed in the superheated steam.

However, the convection heat transfer section 102 is undesirably low in terms of a heat absorption of the boiler, resulting in the need for increase of the heat transfer area of that particular section in an attempt to recover heat sufficiently and raising the problem that the furnace thereof also requires larger dimensions. Further, the conventional furnace employed in the boiler has been found defective in that In this conventional boiler with superheater, furthermore, there has been such problem that its damper or duct is damaged by a high temperature of combustion gas flowing in the bypass, an that, in the case of lowering a temperature by spraying water in the superheated steam, a thermal efficiency will become poor. Still further, to dispose the superheater section 103 behind the convection heat transfer section 102 will also make poor the thermal efficiency, though it may obtain a low-temperature superheated steam. In addition thereto, there will be the problem that if the temperature of superheated steam is lower than a predetermined temperature, a proper improvement will be needed for increasing the heat transfer area of the superheater.

DISCLOSURE OF THE INVENTION

It is a first purpose of the present invention to provide a boiler which permits increasing the heat absorption of the boiler and making uniform the distribution of heat absorption of the boiler in the whole furnace. The second purpose of the invention is to provide a boiler which makes it easy to control the temperature of superheated steam without changing the structure and thermal valance. Also, the third purpose of the invention is to provide a boiler which allows for increasing the amount of heat to be recovered, while keeping constant the heat transfer area in the boiler. Further, the fourth purpose of the invention is to provide a boiler which allows control of temperature zones.

In order to achieve those purposes, in accordance with the present invention, there is provided a boiler which has a radiation heat transfer section in which at least more than one regenerative-heating-type burner system is disposed, the regenerative-heating-type system being provided with a regenerative bed and being arranged such that, through the regenerative bed, a combustion air is supplied into the burner and a combustion gas exhausted from the furnace of boiler, while causing a flow of the combustion air and a flow of the combustion gas to be changed over relative to each other, and then allowing the combustion air to be supplied through the regenerative bed which is heated by a heat of the combustion gas.

In one aspect, as may be required, the boiler in accordance with the present invention may have a convection heat transfer section provided with an exhaust means for introducing a part of the combustion gas from the radiation heat transfer section and directly exhausting that part of combustion gas to the outside of a combustion chamber without passing the same through the regenerative bed.

In another aspect, the boiler in accordance with the invention may be so constructed that a plurality of the above-mentioned regenerative-heating-type burner systems are disposed in the direction along the flow of a boiler water, that two regenerative-heating-type burners forming a pair from those plural burner systems are disposed in a direction transversely of the flow of boiler water, and that a combustion is controlled per one of the burner systems in such a manner as to define a plurality of temperature zones in the direction along the flow of boiler water, thereby allowing for control of a distribution of heat absorption rate in the whole furnace.

In still another aspect, the boiler in accordance with the invention may have a radiation heat transfer section in which at least more than one regenerative-heating-type burner system is disposed, the regenerative-heating-type system being provided with a regenerative bed and being arranged such that, through the regenerative bed, a combustion air is supplied into the burner and a combustion gas is exhausted from the furnace of the boiler, while causing a flow of the combustion air and a flow of the combustion gas to be changed over relative to each other, and then allowing the combustion air to be supplied through the regenerative bed which is heated by heat of the combustion gas, wherein the boiler further has a superheater section for extracting a part of the combustion gas from the radiation heat transfer section, then superheating a saturated steam and directly exhausting the combustion gas to the outside of a combustion chamber without passing the same through the burners. In this particular mode, it is preferable that the amount of combustion gas to be introduced into the superheater section should be controlled in response to the temperature of the superheated steam.

Accordingly, by means of the boiler in this invention, the boiler water is heated only by the radiation heat originated from the combustion gas, which maintains the furnace heat absorption of the boiler in a high state and makes its distribution uniform. Further, the combustion gas is exhausted, keeping its high temperature, through an inoperative one of the burners, to the outside of the combustion chamber, and thus, the heat of the combustion gas is recovered in the corresponding regenerative bed and the gas itself is exhausted, with a relatively low temperature, to the atmosphere. Then, the thus-recovered heat is used to preheat a combustion air and returned into the combustion chamber, hence improving the thermal valance in the boiler. For this reason, there is no need for providing a convention heat transfer section and a small heat transfer area of the boiler furnace suffices in comparison with the conventional boiler. For example, as compared with the conventional boiler, it is possible to reduce the heat transfer area by approx. 30%–60% in order to obtain the same amount of steam. In addition, the boiler is capable of raising the thermal efficiency up to approx. 95%, which means to improve the thermal efficiency higher by 5%–10% than that of the conventional boiler. Moreover, the boiler in accordance with the invention does not require provision of the convection heat transfer section, thus simplifying its structure and reducing the group of water tubes, which contributes not merely to decreasing the area where the boiler is installed, but also to low costs. Even in the event that the convection heat transfer section needs to be provided in the boiler, it will be required only to extract a part of the combustion gas for supply to that section, and therefore, to reduce the heat transfer area will not result in lowering the heat absorption of the boiler, but will lower the temperature of exhausted gas, leading thus to a high heating efficiency economically.

Furthermore, in accordance with the boiler of the present invention, if the plural regenerative-heating-type burner systems are disposed in a direction orthogonal to a direction wherein the boiler water flows, in such a manner as to define plural temperature zones in a direction along the flowing direction of boiler water, then the combustion may be controlled in each of the burner systems to define different zones of different combustion gas temperatures in the radiation heat transfer section, thereby permitting controlling of the distribution of heat absorption rate in the whole furnace, as desired.

Yet further, in accordance with the boiler of the present invention, since part of the combustion gas is extracted and supplied to the superheater section to superheat a superheated steam, it is possible to control the amount of extracted combustion gas and therefore, in contrast to the conventional boiler with superheater having the same heat transfer area, the temperature of the superheated steam can easily be controlled by such control of the amount of extracted combustion gas.

BEST MODE FOR CARRYING OUT THE INVENTION

Figure 1A:
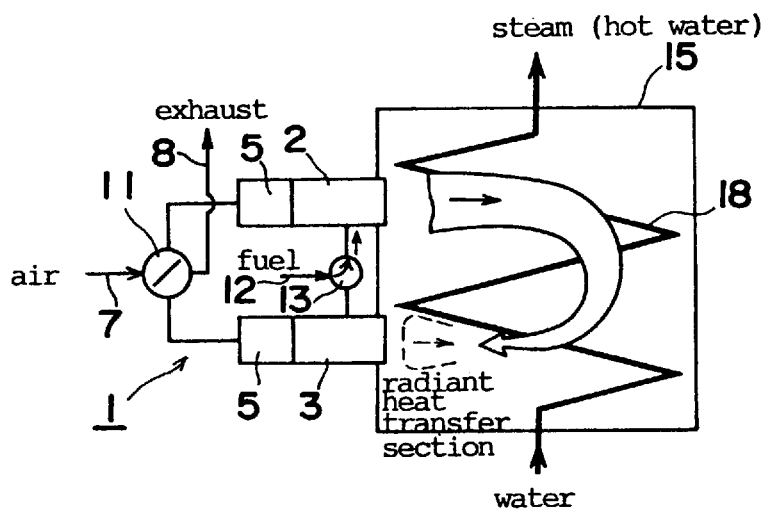
FIG. 1A is an generation principle diagram of a boiler in accordance with the present invention.

Hereinafter, a specific description will be made of the construction of the present invention, with reference to the embodiments shown in the drawings.

FIG. 1A shows one example of an operation principle diagram for a boiler in accordance with the present invention. This boiler has a combustion chamber which is formed only by a radiation heat transfer section 15, where at least one unit of regenerative-heating-type burner system 1 is provided in a surface of wall of furnace. In the case of the present embodiment, the regenerative-heating-type burner system 1 comprises, in combination, at least one pair of burners 2, 3 and one pair of regenerative beds 5, the burners being disposed on the same wall of furnace, whereby a combustion may be alternately effected by one of those two burners 2, 3, while allowing a combustion gas generated to be exhausted through another of the same burners 2, 3 and regenerative beds 5.

Figure 21:
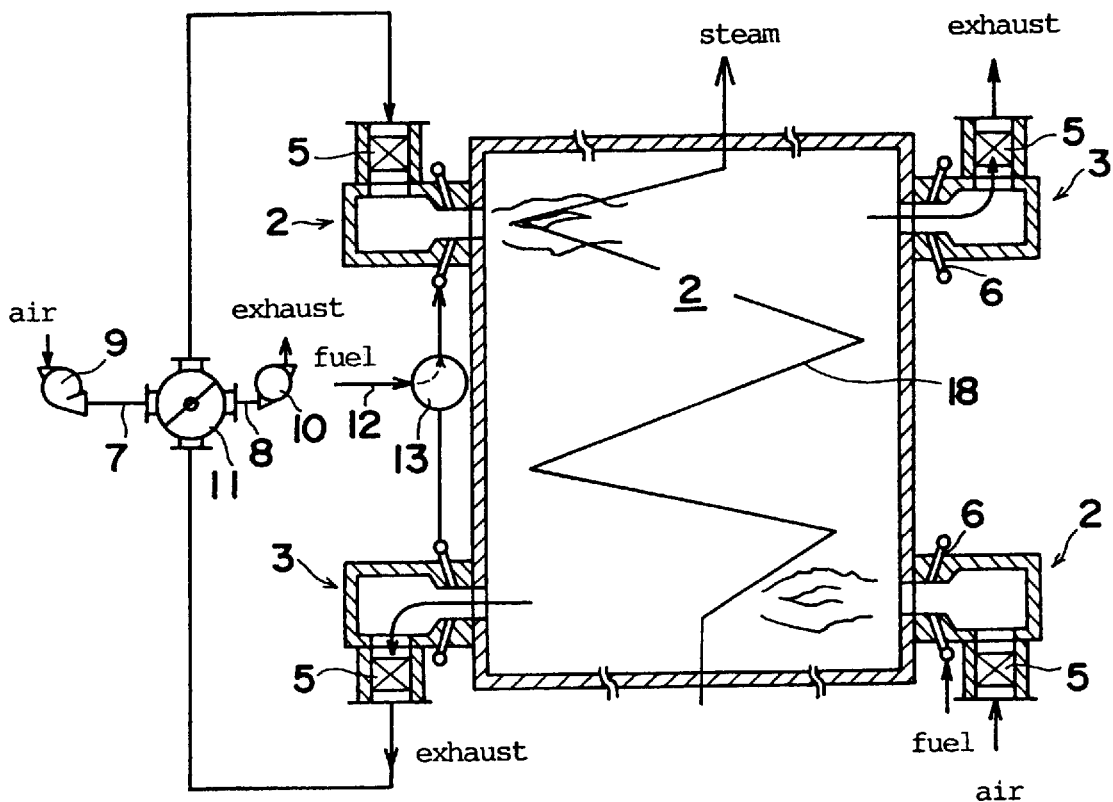
FIG. 21 is a schematic diagram which explanatorily shows one example of regenerative-heating-type burner systems used in the boiler of the present invention.

In this connection, the regenerative-heating-type burner system 1 is not limitative in structure and combustion method, but as shown in FIG. 21 for instance, the system may be constructed such that the wind boxes respectively of the foregoing pair of burners 2, 3 may be selectively connected, by means of four-way valves 11, with a combustion air supply system 7 for supplying a combustion air and a combustion gas exhaust system 8 for exhausting a combustion gas, respectively, so that, the combustion air may be supplied and the combustion gas be exhausted, through their corresponding regenerative beds 5. At this moment, those combustion air supply and combustion gas exhaust systems 7, 8 may be connected selectively, by the four-way valves 11, with one of the wind boxes respectively of the burners 2, 3. For example, it may be so arranged that a combustion air supplied by a forces draft fan 9 is supplied into the wind box while at the same time a combustion gas generated is drawn and exhausted by an induced draft fan 10 out of the wind box to the atmosphere as shown in FIG. 21 for example. Further, a fuel may be selectively supplied through a three-way valve 13 into one of the two burners 2, 3. Designation 18 denotes a heat exchanger through which the boiler water flows. In the present embodiment, there are provided nozzles 6, 6 in such a manner as to inject a fuel from an inward peripheral surface made of a refractory material which forms a burner throat and cause the fuel to intersect the flow of a combustion air passing through that burner throat. With regard to the nozzles, 6, 6, only one of them may be embedded in the burner throat, which certainly suffices for this particular purpose, but more than two nozzles may be disposed equidistantly in a direction circumferentially of the burner throat, which will enable adjusting a fuel blockage ratio, i.e. a ratio at which the injected fuel blocks or occupies the cross-sectional area of the burner throat so as to permit for varying the characteristics for mixing the fuel with air, in which case also, a flame may be created at the center of the burner throat. In this particular mode, it is possible to vary an angle between the flow of fuel jetted from the nozzles 6, 6 and the flow of air so as to change a speed for mixing the fuel and air, and in that way, the length of flame created thereby may be varied. The fuel is not limited to a liquid fuel or gaseous fuel, but may be a pulverized coal fuel or the like. Also, the disposition and structure of the fuel nozzles are not specifically limitative. In accordance with the present invention, it may be so arranged that the fuel is supplied in two steps, as for example, the fuel may be supplied to a upstream side within the wind box and then supplied to a point adjacent the exit of the burner throat, whereby a part of the fuel may be burnt by a whole amount of combustion air to perform a first combustion and thereafter another unburnt part of the fuel be burnt by a residual oxygen remaining in a combustion gas generated, to thereby perform a second combustion. Further, the regenerative bed 5 is not specifically limitative, and may be formed into a cylindrical body with a honeycomb-like structure which is made of a fine ceramics.

As constructed above, a pair of regenerative-heating-type burners 2, 3 are each alternately brought in operation for the combustion, so that a combustion gas generated thereby is exhausted through the combustion gas exhaust system 8 associated with one of those two burners which is being inoperative for the combustion, and then a heat of the combustion exhausted is recovered by the corresponding regenerative bed 5. After lapse of a given period of time, the inoperative burner 3 (or 2) opposite to the operative one is then brought in operation for combustion, while exhausting a combustion gas generated thereby through that opposite burner 2 (or 3) which has been operative for combustion. At this moment, the combustion air absorbs a heat stored in the regenerative bed 5 associated with the burner 3 (or 2) which had previously been inoperative and is thereby preheated at a high temperature, for example, at 700° C.–1,000° C. before being supplied into the burner. Operation for alternating those combustion and exhaust may be effected at the interval of 20 sec.–2 min. for instance, but preferably at the interval of 20 sec.–40 sec. or each time that the temperature of combustion gas being exhausted reaches a controlled temperature say, at approx. 200° C.

Figure 1B:
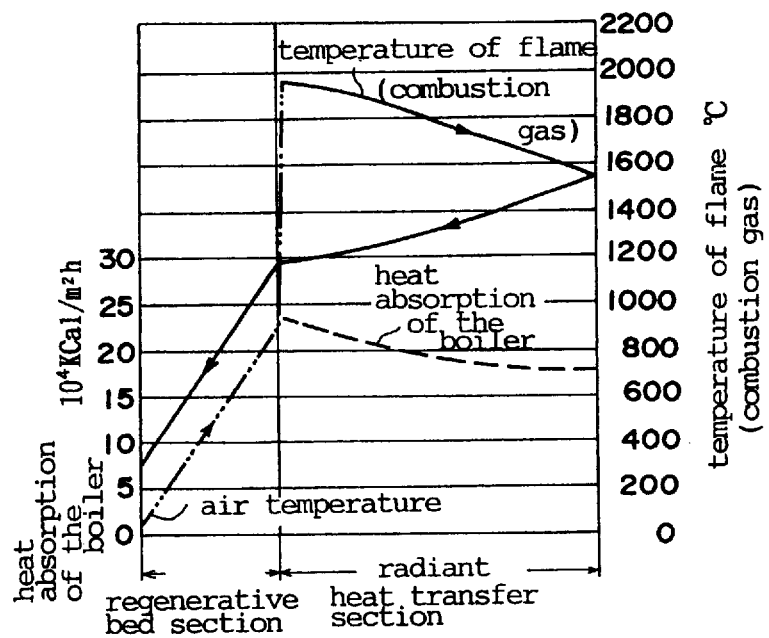
FIG. 1B is a graph showing the heat absorption of the boiler.

The heat absorption of the boiler in the present embodiment is indicated in FIG. 1B.

Figure 4A:
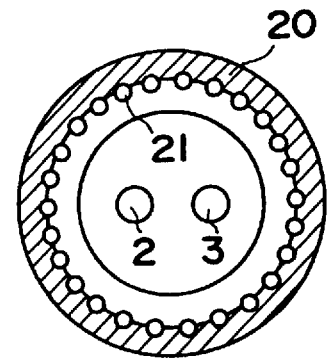
FIG. 4A is a cross-sectional view of another embodiment of the once-through-type water tube boiler to which the present invention is applied.
Figure 4B:
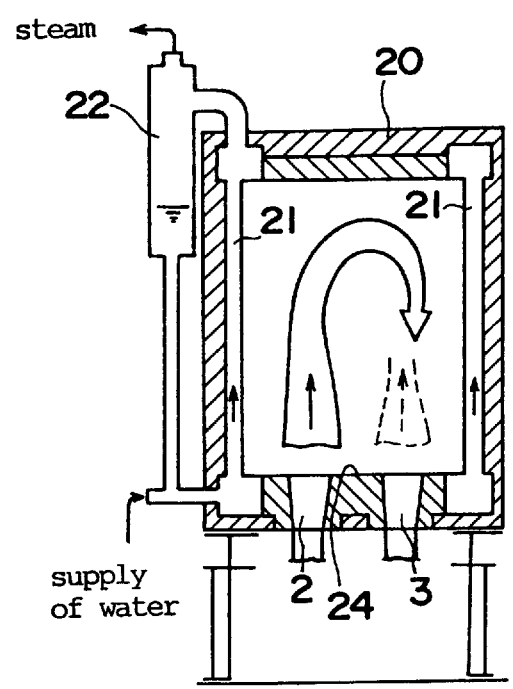
FIG. 4B is a longitudinally sectional view of the same boiler.

The boiler shown in FIG. 1A is embodied more specifically in FIG. 3A, FIGS. 3B, 4A and 4B. These embodiments are applied to a once-through-type water tube boiler. This boiler is provided with a group of water tubes 21, 21, . . . , 21 embedded in the surface of wall of a cylindrical furnace 20, and so constructed that a boiler water is subject to heating during its being supplied upwardly through the water tubes 21, . . . , 21 from the downward side, then only a steam is extracted in the steam separator 22 disposed at the upper end side, and a hot water gained is again supplied together with a boiler water from the downward side into the boiler. Mounted upon the top portion 23 of the foregoing furnace 20 are a pair of regenerative-heating-type burners 2, 3, by means of which, a flame is created in parallel with the water tubes 21 and thereafter a gas is exhausted from the upper inoperative burner. Alternately, as shown in FIGS. 4A and 4B, the burners 2, 3 may be disposed side by side in the bottom portion 24 of the furnace 20, whereby a flame is created towards the furnace top portion 23 and a combustion gas generated is exhausted from the side of that bottom portion 24.

Figure 2A:
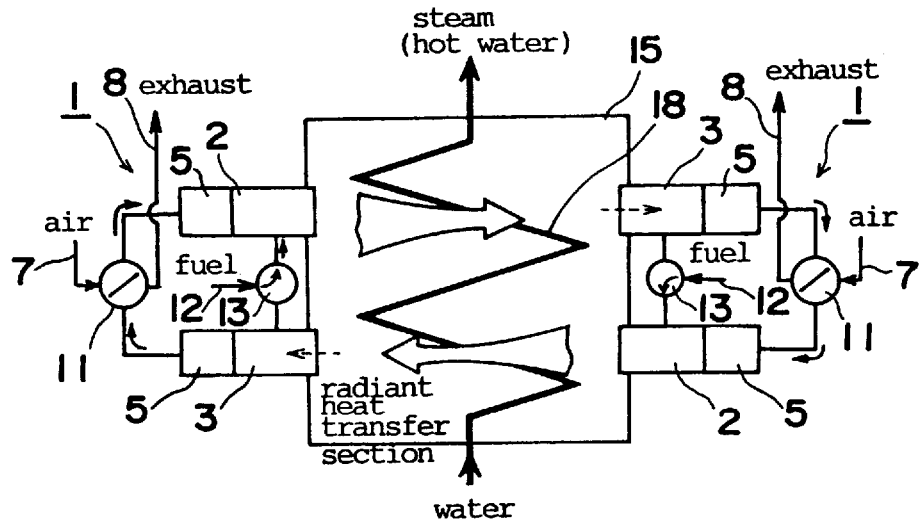
FIG. 2A is an operation principle diagram of one embodiment of the boiler in accordance with the invention.
Figure 2B:
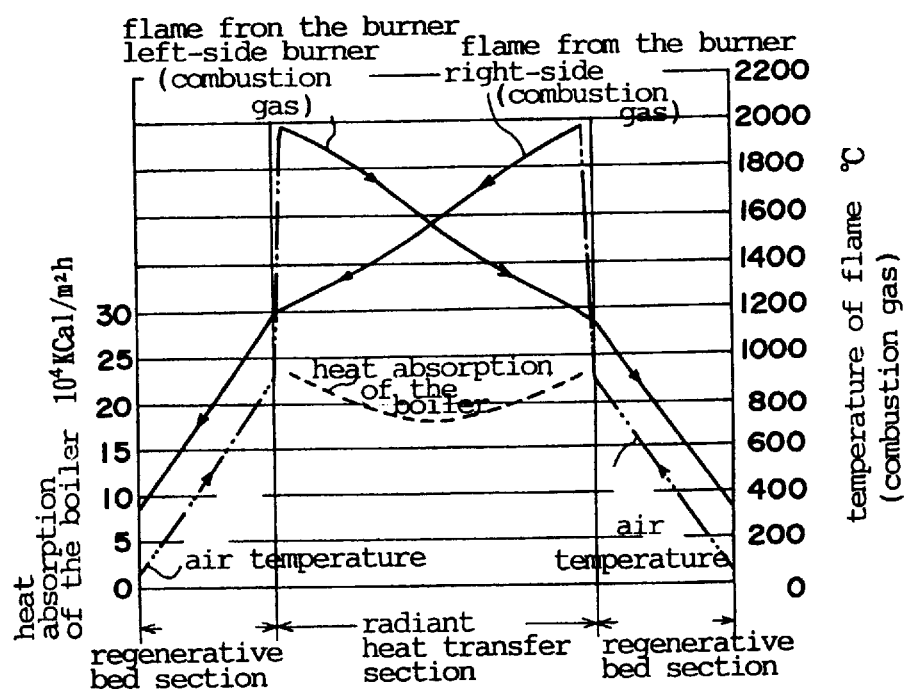
FIG. 2B is a graph showing the heat absorption of the boiler.
Figure 3A:
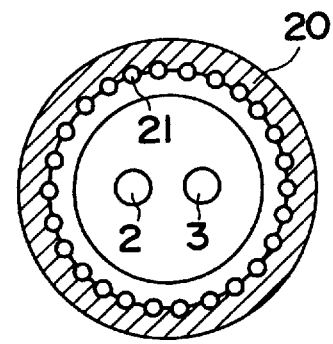
FIG. 3A is a cross-sectional view of a once-through-type water tube boiler to which is applied the present invention.
Figure 3B:
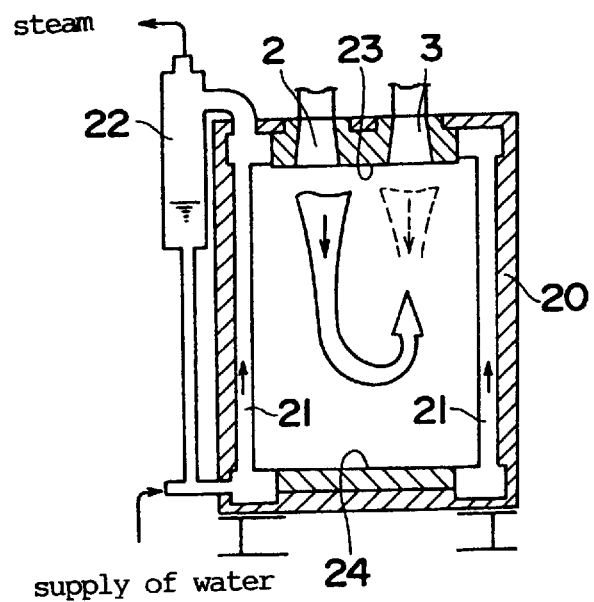
FIG. 3B is a longitudinally sectional view of the same boiler.

FIG. 2A shows another embodiment. According to this embodiment, at least two units of the regenerative-heating-type burner systems 1 are disposed at two opposed walls of the furnace, respectively, with such an arrangement that a combustion gas is blown out and exhausted between the two opposed burners 2, 3, without flowing the combustion gas between the common adjoining two burners 2, 3 disposed on the same wall of furnace. For example, as viewed from the figure, a combustion gas to be blown from the upper burner 2 provided in the left-side furnace wall will be subject to heat absorption in the upper burner 3 provided in the right-side furnace wall, recovering thus a heat from the combustion gas, and then discharged therefrom to the atmosphere. On the other hand, a combustion gas to be blown from the lower burner 2 provided in the right-side furnace wall will be subject to heat absorption in the lower burner 3 provided, in the left-side furnace wall, recovering a heat from the gas, and then discharged therefrom to the atmosphere. Subsequent thereto, though not shown, with the combustion alternated between the burners, a combustion gas will be blown from the lower burner 3 on the left side, while also a combustion gas will be blown from the upper burner 3 on the right side. Then, each of the gases will be exhausted from the respective burners facing oppositely towards those operative burners. In this case, the heat absorption of the boiler is obtained as shown in FIG. 2B.

Figure 5A:
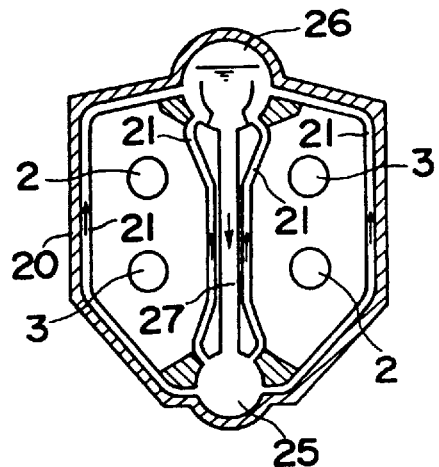
FIG. 5A is a longitudinally sectional view of a natural-circulation-type water tube boiler, in which the present invention is applied along the water tubes.
Figure 5B:
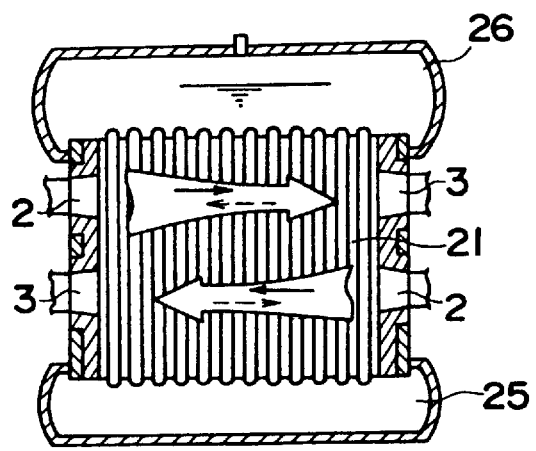
FIG. 5B is a longitudinally sectional view showing the same boiler along the walls thereof.
Figure 6A:
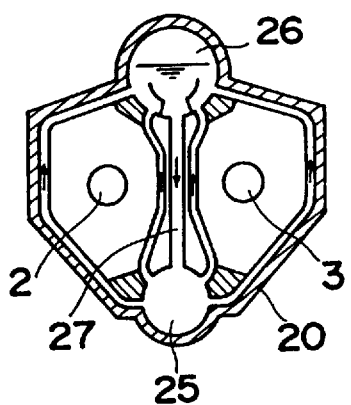
FIG. 6A is a longitudinally sectional view showing another embodiment of the natural-circulation-type water tube boiler, in which the present invention is applied along the water tubes.
Figure 6B:
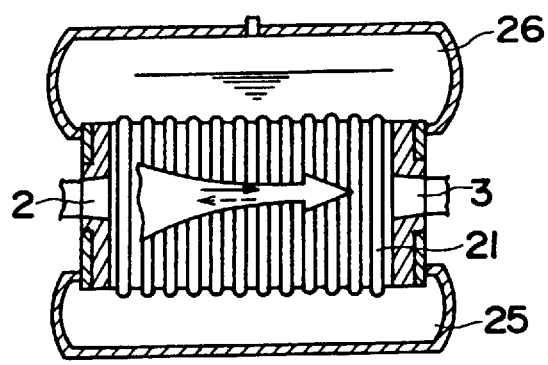
FIG. 6B is a longitudinally sectional view showing the same boiler along the walls thereof.
Figure 6C:
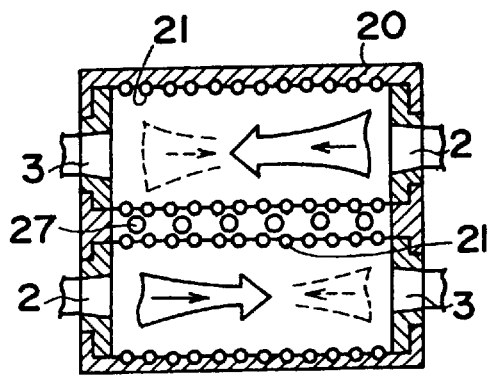
FIG. 6C is a cross-sectional view of the same boiler.

FIGS. 5–10 illustrate the specific embodiments of the foregoing boiler shown in FIG. 2A. FIGS. 5 and 6 show an embodiment applied to a natural-circulation-type water tube boiler, wherein a lower drum 25 is connected with an upper drum 26 for a flow communication therebetween by means of water tubes 21, 21, . . . , 21 and a downcast pipe 27, so that a boiler water flowing upwardly in those water tube groups 21, 21, . . . , 21 is again flowed downwardly through the downcast pipe 27 when the water reaches the upper drum 26, thereby causing the water to be circulated in a natural way. The natural circulation of boiler water is effected due to a difference in density between the mixture of steam and hot water in the water tubes 21 heated extremely by the radiation heat and the water in the downcast pipe 27 which is not heated at all or gently heated by virtue of the water tubes 21 shielding the pipe. In the present embodiments, it may be so arranged that four units of burner systems (see FIGS. 5A and 5B) or two units of burner system (see FIGS. 6A, 6B and 6C) are disposed such as to form flames in a direction transversely of the water tube groups 21, 21, . . . , 21, i.e. in the right and left directions as viewed from the figures. The illustrated natural-circulation-type water tube boilers each have two burners 2, 3 which form a regenerative-heating-type burner system 1 and are provided in the right-side and left-side furnace walls. According thereto, a combustion gas to be blown from the burner 2 or 3 at one of the furnace walls will pass across the interior of furnace into the corresponding burner 3 or 2, and be exhausted therefrom, so that a heat of the combustion gas may be recovered by the corresponding regenerative bed 5, and thereafter, the gas will become a low-temperature exhaust gas and be exhausted out to the atmosphere. Then, with the combustion alternated between the burners, a combustion air, which has been preheated through the foregoing regenerative bed 5 storing the heat of that combustion gas, will be supplied to the burner, allowing a high-temperature combustion gas to be obtained with a small amount of fuel and also causing the same gas to be exhausted through the burner and regenerative bed at another opposite furnace wall. At this point, as shown in FIG. 5A, 5B or 6A, the downcast pipe 27 is shielded from the combustion gas, because, according to the present natural-circulation-type water tube boiler, that downcast pipe 27 is disposed centrally thereof and interposed or sandwiched between the walls which are formed by the water tubes 21. The boiler further has another groups of water tubes 21, 21, . . . , 21 formed at both lateral wall surfaces thereof.

Figure 7A:
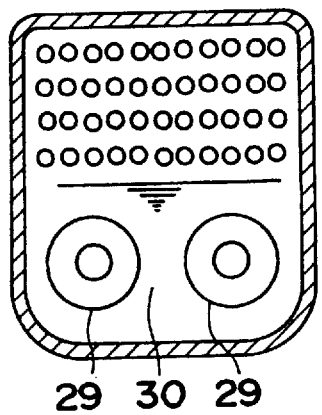
FIG. 7A is a longitudinally sectional view showing a vacuum boiler in the direction intersecting the water tubes of the boiler, to which the present invention is applied.
Figure 7B:
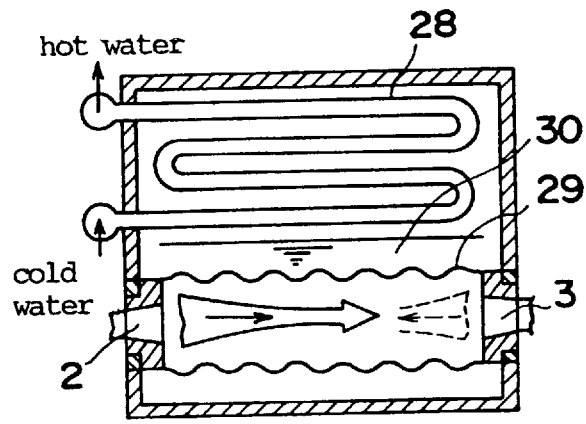
FIG. 7B is a longitudinally sectional view showing the same boiler along the water tubes thereof.
Figure 7C:
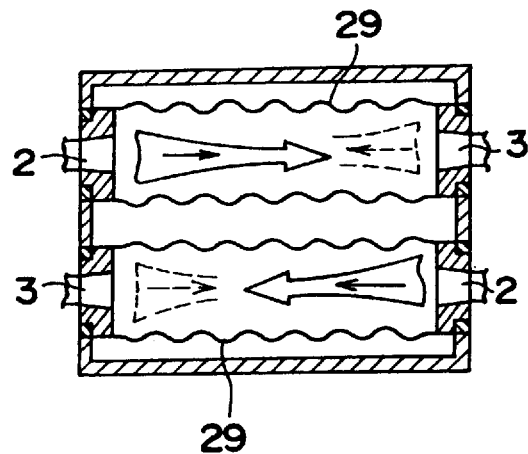
FIG. 7C is a cross-sectional view of the same boiler.
Figure 8:
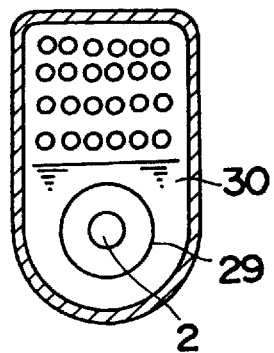
FIG. 8 is a longitudinally sectional view showing another embodiment of the vacuum boiler to which is applied the invention.

FIGS. 7A, 7B, 7C and 8 illustrate embodiments of the present invention applied to a vacuum boiler. The vacuum boiler has a tubing 28 disposed in the upper half portion thereof, through which tubing a boiler water flows, and has an area lower than such upper half portion, where a boiler water 30 is reserved. Disposed within the boiler water 30 is a flue 29 forming a combustion chamber, both ends of which are provided respectively with a pair of burners 2, 3. Referring to FIGS. 7A to 7C, it is to be therefore understood that there are provided two units of regenerative-heating-type burner systems 1, each being disposed in the right-side furnace wall on the same plane and in the left-side furnace wall on the same plane, respectively. With this structure, the mutually opposed burners are communicated with each other through the duct 29, hence permitting a combustion gas to be blown and exhausted among those opposed burners. Or, alternatively, as shown in FIG. 8, a pair of burners 2, 3 may each be disposed in both mutually opposed walls of furnace and the two burners 2, 3 be communicated with each other through one duct 29.

Figure 9A:
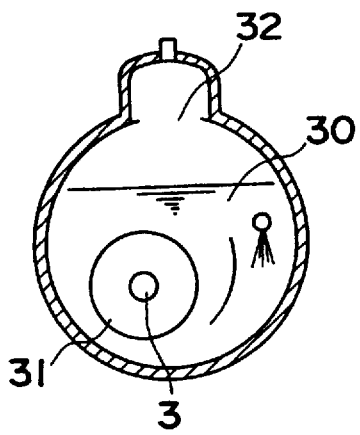
FIG. 9A is a cross-sectional view of a flue boiler to which the invention is applied.
Figure 9B:
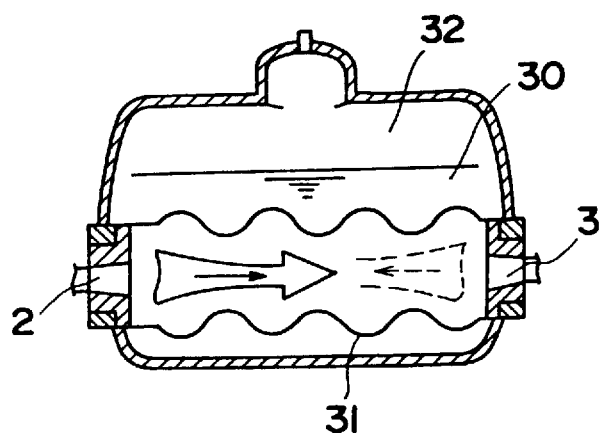
FIG. 9B is a longitudinally sectional view of the flue boiler.
Figure 10A:
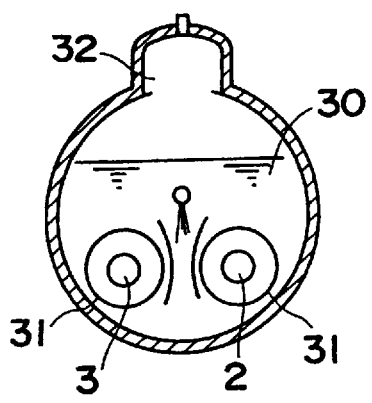
FIG. 10A is a cross-sectional view showing another embodiment of the flue boiler to which is applied the invention.
Figure 10B:
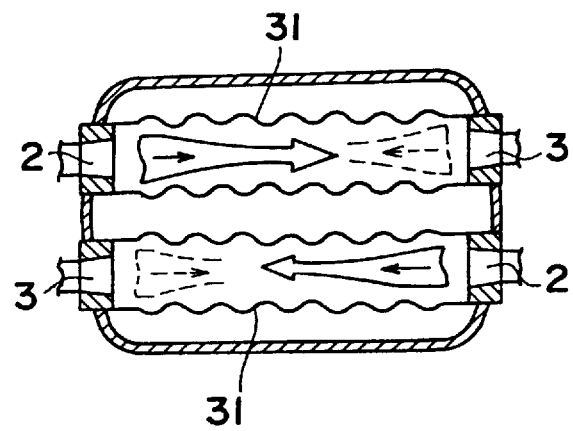
FIG. 10B is a longitudinally sectional view of the same boiler.

FIGS. 9A and 9B as well as FIGS. 10A and 10B show embodiments of the present invention applied to a flue boiler. The flue boiler has a lower half portion in which a boiler water 30 is reserved, with a duct 31 extending through the boiler water 30, and further has a spacing 32 defined in the upper portion thereof, through which spacing, a steam is to be removed. A combustion chamber is formed by the duct 31, having both ends with which are provided burners 2, 3 forming a regenerative-heating-type burner system, hence permitting a combustion gas to flow in the duct 31. Of course, as in FIGS. 10A and 10B, the regenerative-heating-type burner system 1, and the duct 31 which acts as a combustion chamber are not limited to one unit or one piece, but may be provided in a plural form.

Figure 11A:
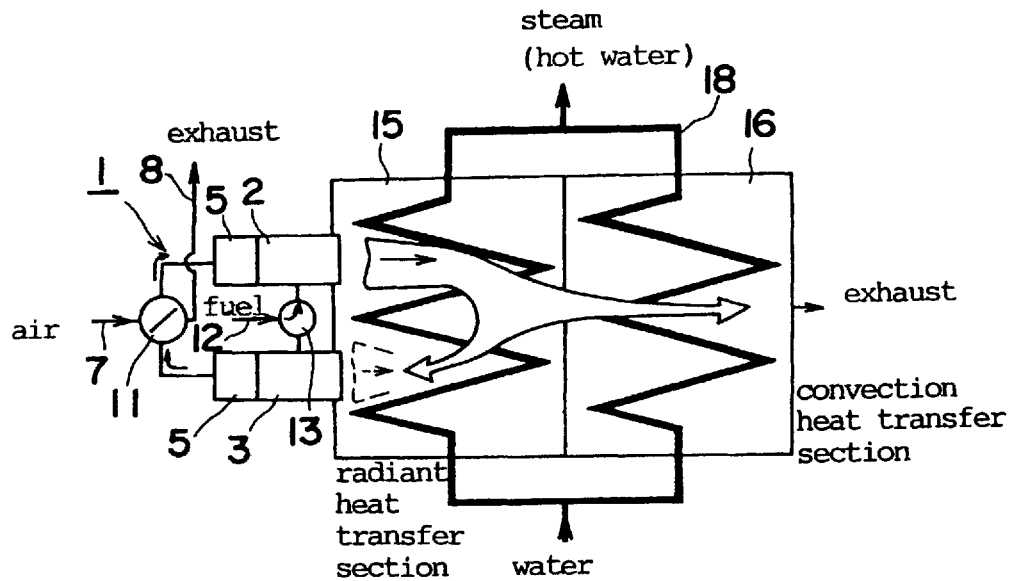
FIG. 11A is an operation principle diagram of another mode of boiler in accordance with the invention.
Figure 11B:
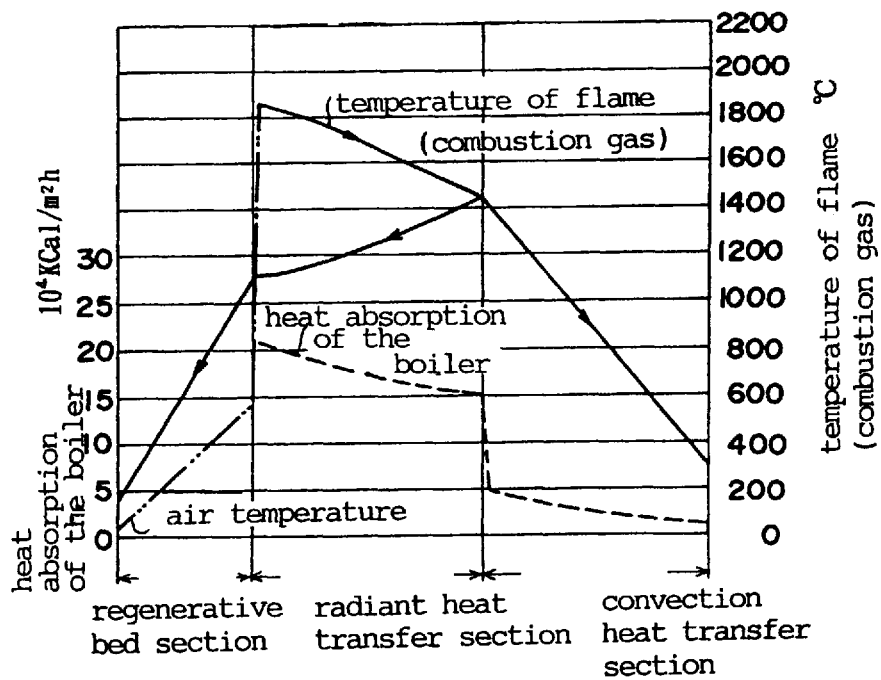
FIG. 11B is a graph showing heat absorption of the boiler in the same boiler.

FIG. 11A shows still another embodiment of the present invention. In this embodiment, a radiation heat transfer section 15 is constructed together with at least one unit of regenerative-heating-type burner system, and additionally, a convection heat transfer section 16 is defined in combination therewith. It is so arranged that a part of combustion gas may be extracted, as required, from the convection heat transfer section 15. The heat absorption of the boiler is obtained as shown in FIG. 11B.

Figure 12A:
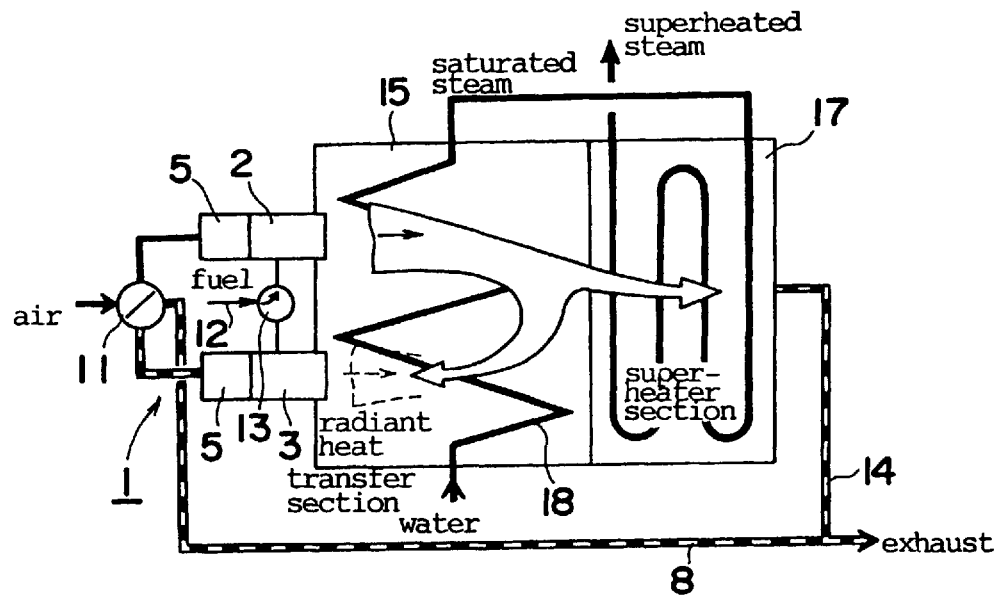
FIG. 12A is an operation principle diagram of a boiler with superheater in accordance with the invention.
Figure 12B:
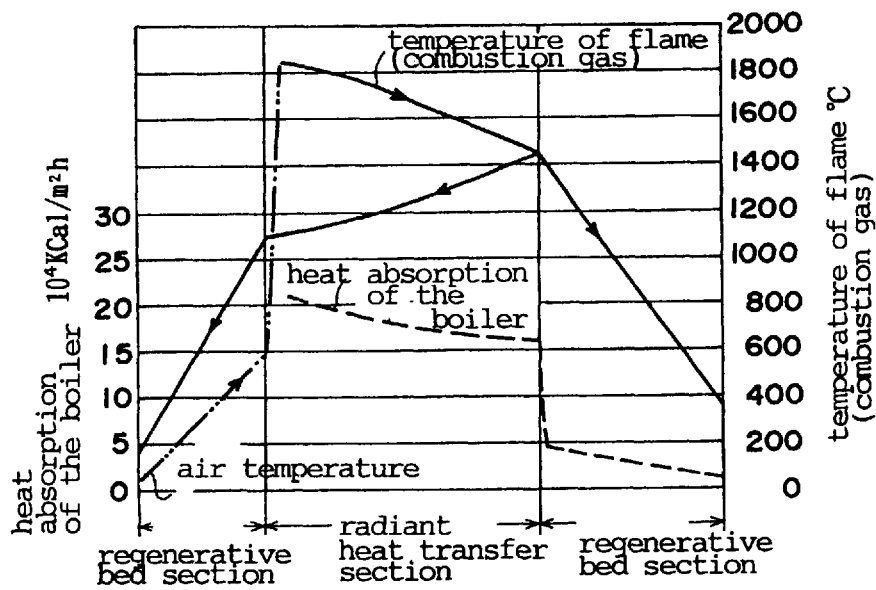
FIG. 12B is a graph showing heat absorption of the boiler in the same boiler.
Figure 13A:
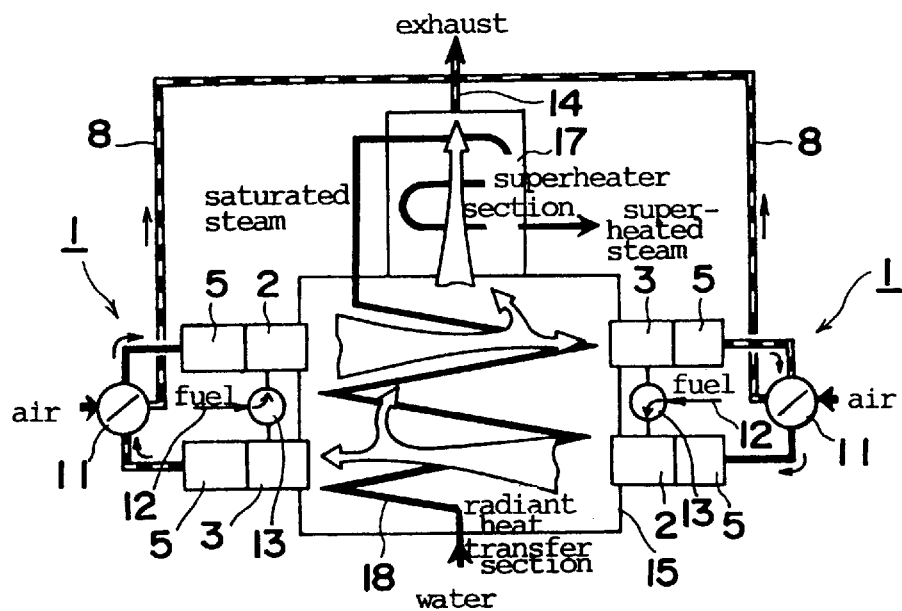
FIG. 13A is an operation principle diagram of a boiler with superheater in accordance with the invention.
Figure 13B:
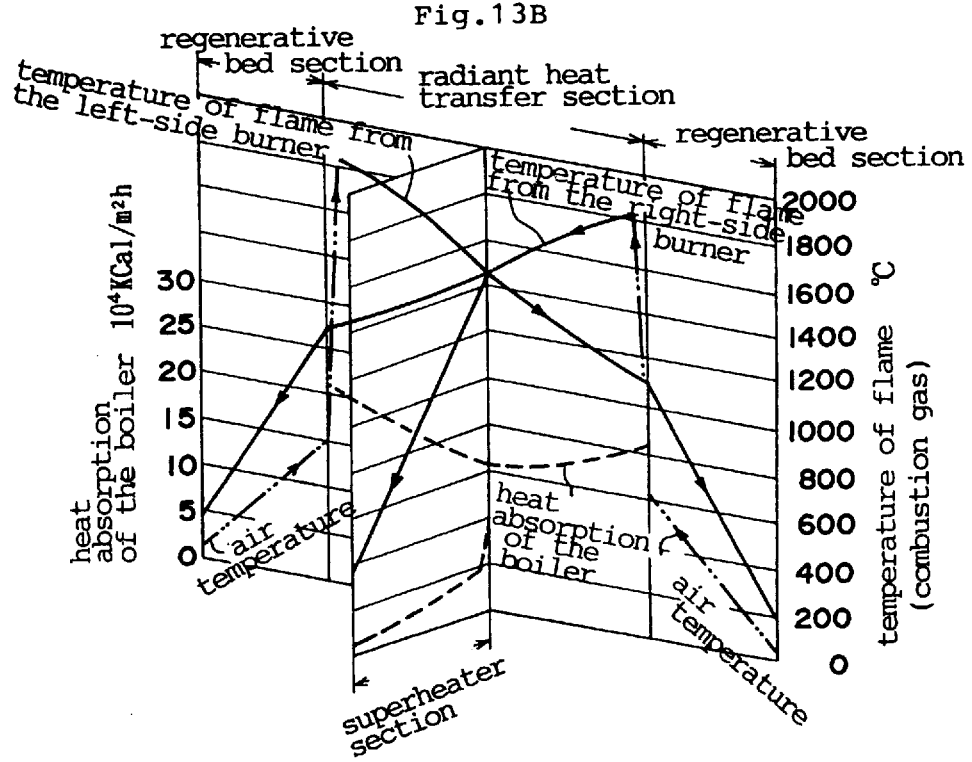
FIG. 13B is a graph showing heat absorption of the boiler in the same boiler.

FIGS. 12A and 13A show operation principle diagrams concerning a boiler with superheater to which the present invention is applied. The boiler shown in FIG. 12A has a radiation heat transfer section 15 and a superheater section 17 defined therein, with more than one unit of regenerativeheating-type burner system 1 being provided at the radiation heat transfer section 15, the arrangement of the boiler being such that a part of a combustion gas flowing in the burner system 1 will be extracted and flowed to the superheater section 17, to thereby superheat a saturated steam generated in the radiation heat transfer section 15. Otherwise stated, the exhaust system 8 of the regenerative-heating-type burner system 1 is connected with the exhaust system 14 of the superheater section 17, so as to cause a part of combustion gas to be exhausted through the superheater section 17 and flowed through the regenerative bed 5 of an inoperative burner for final exhaust. In this case, the heat absorption of the boiler is obtained as shown in FIG. 12B. Alternately, as shown in FIG. 13A, more than one unit of regenerative-heating-type burner system 1 may be provided in both two opposed walls of the radiation heat transfer section 15, to thereby permit a combustion gas to be blown and exhausted among the mutually opposed burners disposed at the different walls, so that a part of the combustion gas may be extracted to the superheater section 17 which is formed between those two opposed walls, each of which is provided with the burner system 1, and such part of combustion gas be exhausted therefrom. In that case, the heat absorption of the boiler is obtained as shown in FIG. 13B.

Figure 14:
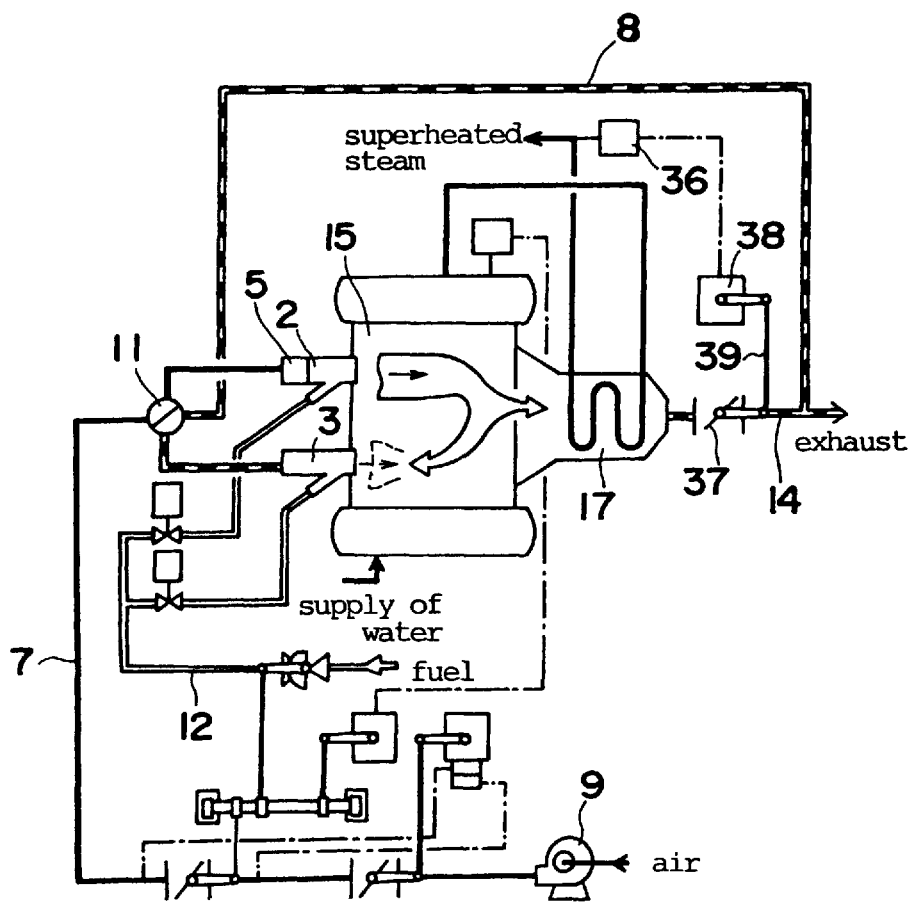
FIG. 14 is an operation principle diagram showing one way for adjusting the temperature of superheated steam in the boiler with superheater in accordance with the present invention.
Figure 15:
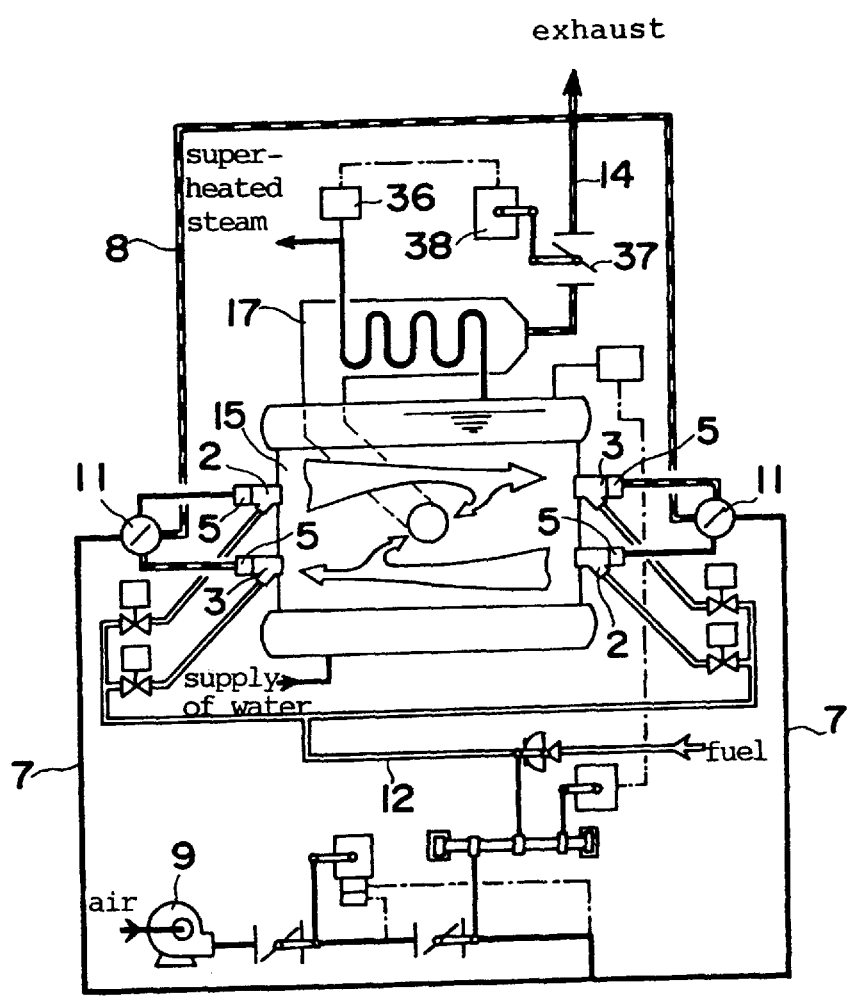
FIG. 15 is an operation principle diagram showing another example of adjusting the temperature of superheated steam in the boiler with superheater in accordance with the invention.

FIGS. 14 and 15 show one example of way for adjusting the temperature of superheated steam in the foregoing boiler with superheater shown in FIGS. 12A and 13A. Designation 36 denotes a temperature sensor, designation 37 denotes a damper operable for adjustment of exhaust from the superheater section 17, designation 38 denotes an actuator which is controlled responsive to the temperature sensor 36, and designation 39 denotes a link mechanism for transmitting a motion of the actuator 38 to the damper 37. With such structure, in the case where a temperature of superheated steam detected by the temperature sensor 36 exceeds over a predetermined value, the actuator 38 will be operated to close the damper 37, preventing leakage of a part combustion gas into the superheater section 17, and conversely, if the superheated steam temperature is below that predetermined value, the actuator 38 will be operated to open the damper 37, allowing a part of combustion gas to be exhausted through the superheater section 17. In this regard, an amount of combustion gas flowing through the superheater section 17 may be adjusted by controlling the degree for opening or closing the damper 37.

Figure 16A:
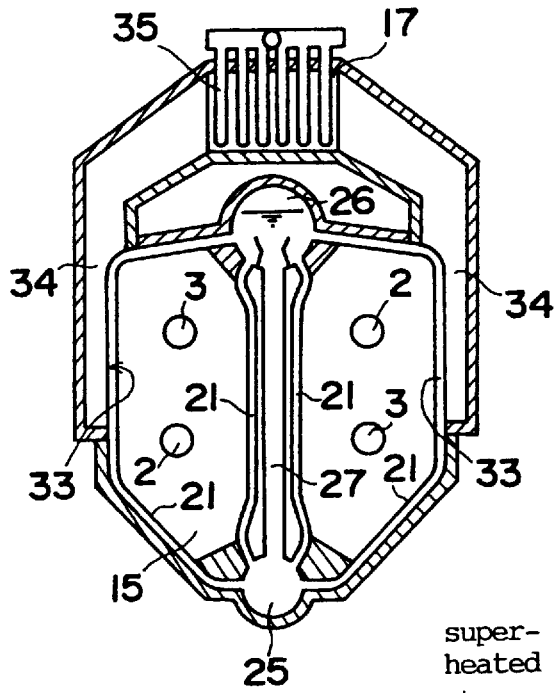
FIG. 16A is a longitudinally sectional view showing a natural-circulation-type water tube boiler along the water tubes thereof, to which is applied the boiler with superheater of the present invention.
Figure 16B:
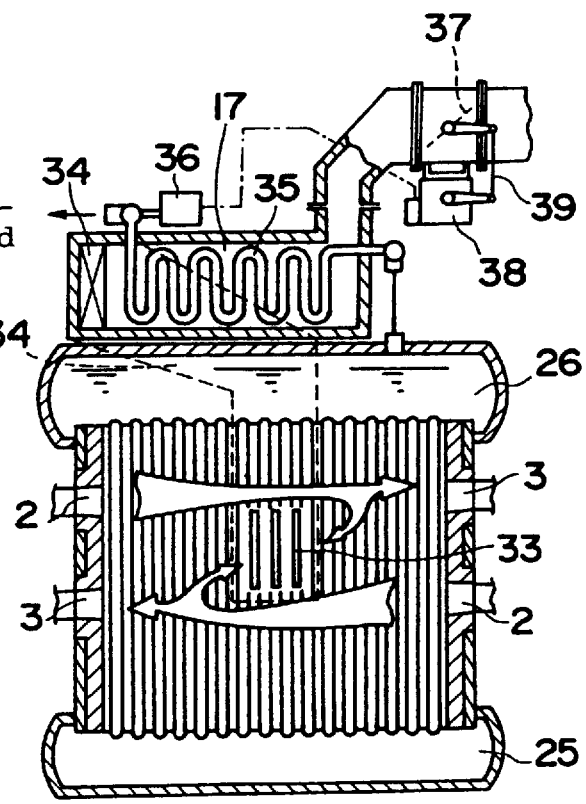
FIG. 16B is a longitudinally sectional view showing the same boiler along the walls thereof.
Figure 16C:
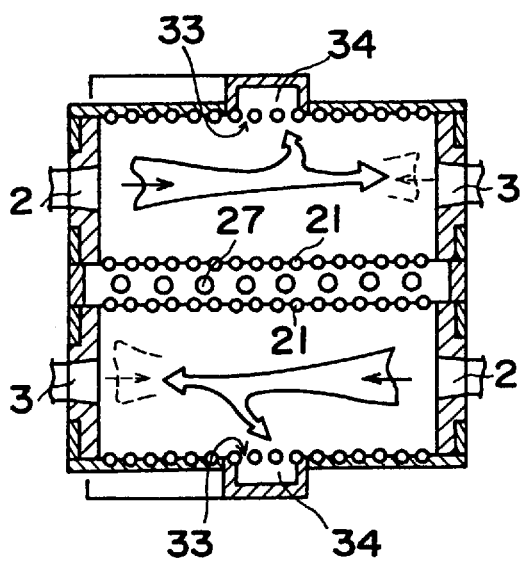
FIG. 16C is a cross-sectional view of the same boiler.
Figure 17A:
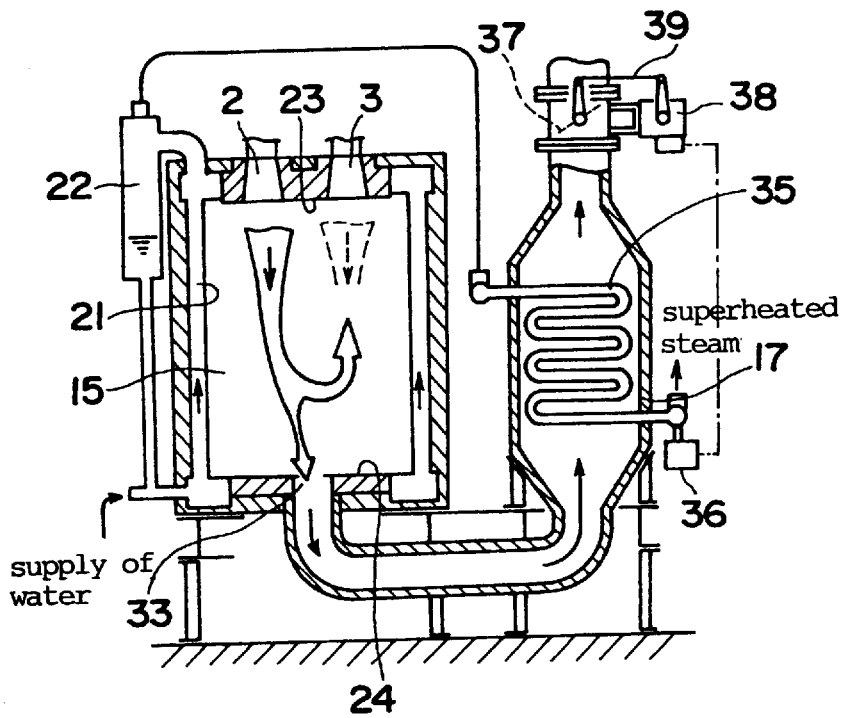
FIG. 17A is a longitudinally sectional view showing an over-fired- and -once-through-type water tube boiler to which is applied the boiler with superheater of the present invention.
Figure 17B:
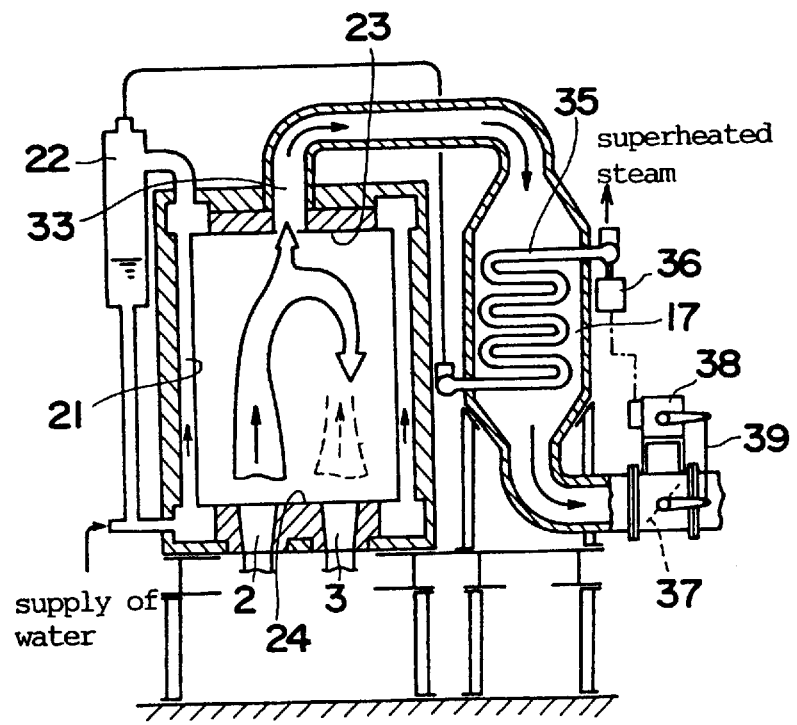
FIG. 17B is a longitudinally sectional view showing an underfired- and -once-through-type water tube boiler.

FIGS. 16A, 16B and 16C as well as FIGS. 17A and 17B illustrate specific embodiments of the above-described boiler with superheater shown in FIGS. 12A through 15. FIG. 16A to 16C show an embodiment of natural-circulation-type water tube boiler. This boiler is of the structure wherein exhaust holes 33 are formed at a center of the furnace wall of the boiler such that each of them is defined between adjoining two of plural water tubes 21, and wherein those exhaust holes 33 are in a flow communication with the superheater section 17 through flues 34, thereby permitting a saturated steam to be superheated by a part of combustion gas. In this regard, the saturated steam is extracted from an upper drum 26 and then flowed through a heat exchanger 35 provided in the superheater section 17. There is a temperature sensor 36 disposed at the exit of the heat exchanger 35, with such an arrangement that the amount of combination gas to be introduced into the superheater section 17 may be controlled properly in accordance as the sensor 36 senses the temperature of superheated steam at the exit of the heat exchanger. For instance, the damper 37 may be provided in a flue/exhaust system 40 associated with the superheater, and the actuator 38 for causing opening or closing the damper 37 may be controlled its drive by means of the temperature sensor 36. It is noted that the motion of the actuator 38 is transmitted as a rotational motion through the link mechanism 39 to the damper 37.

FIG. 17 shows an embodiment of once-through-type boiler. This sort of boiler, as applied to the present invention, should be so constructed that at least more than one unit of regenerative-heating-type burner system is disposed at the upper portion of furnace, whereas an exhaust hole 33 is provided at the bottom side of the same furnace, through which exhaust hole 33, a part of combustion gas is to be extracted. The arrangement of this particular boiler is such that a flow communication is established between the exhaust hole 33 and the superheater section 17 to permit a part of combustion gas to be exhausted through the burner 3 or 2, with that part of combustion gas flowing through the superheater section 17 before being exhausted. In the superheater section 17, the temperature sensor 8 is provided, which detects the temperature of superheated steam, and, with the detection of sensor 36, the actuator 38, which operates to adjust the opening degree of the damper 37 disposed at the exit of the superheater section 17, may be controlled properly. FIG. 17B shows another embodiment of the once-through-type boiler, according to which, the position where the burners 2, 3 are disposed and the location of the exhaust hole 33 are set in a manner reversal to those shown in FIG. 17A.

Figure 18:
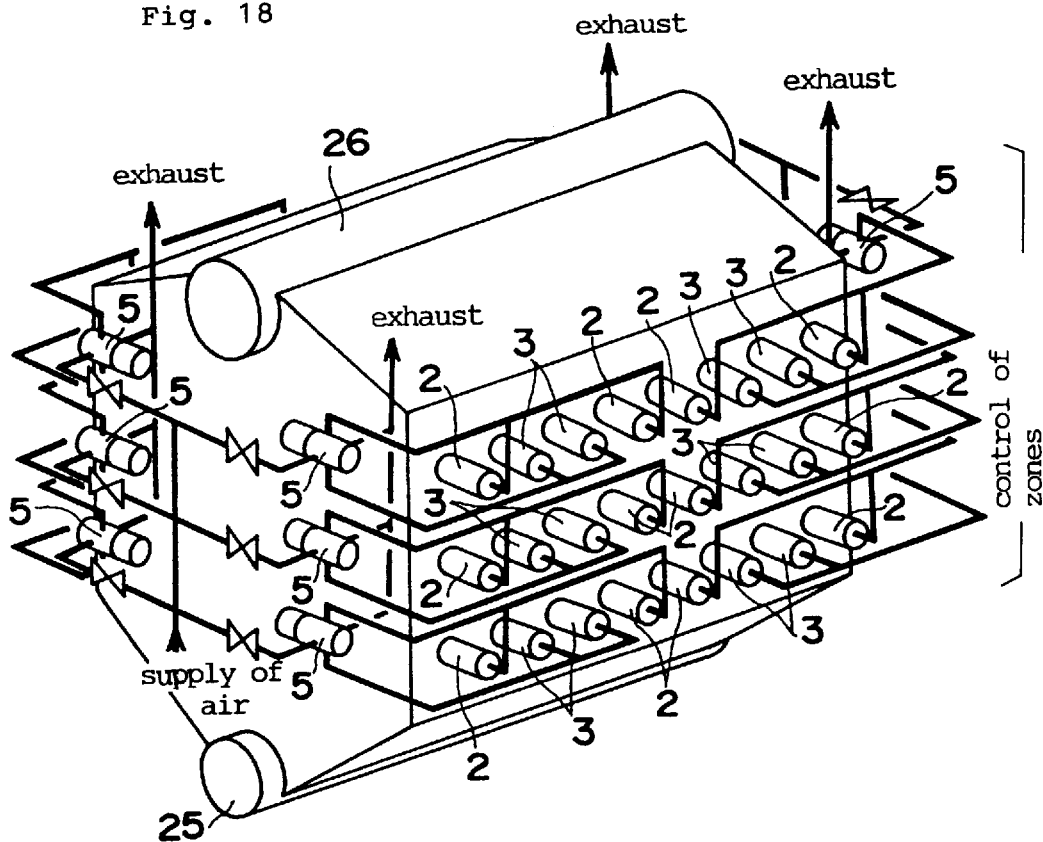
FIG. 18 is a perspective view of the once-through-type water tube boiler to which the present invention is applied.
Figure 19:
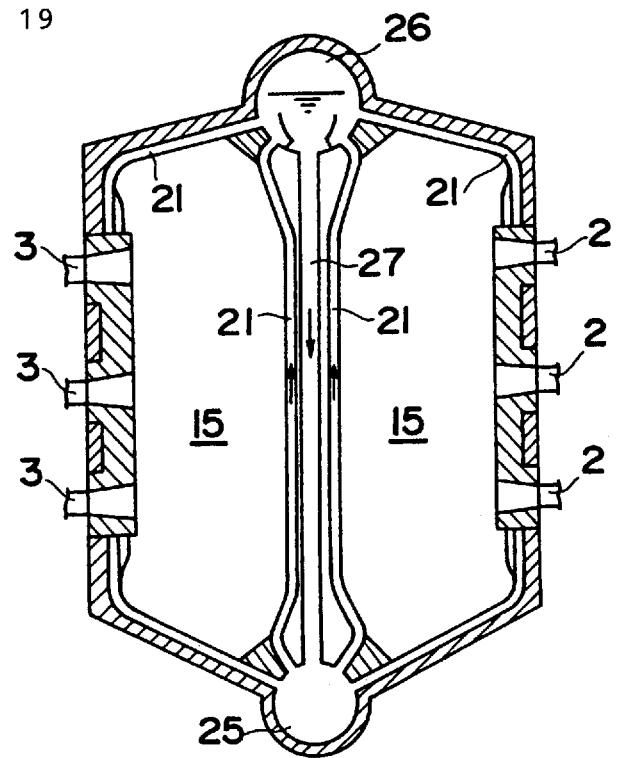
FIG. 19 is a longitudinally sectional view of the boiler shown in FIG. 18.
Figure 20:
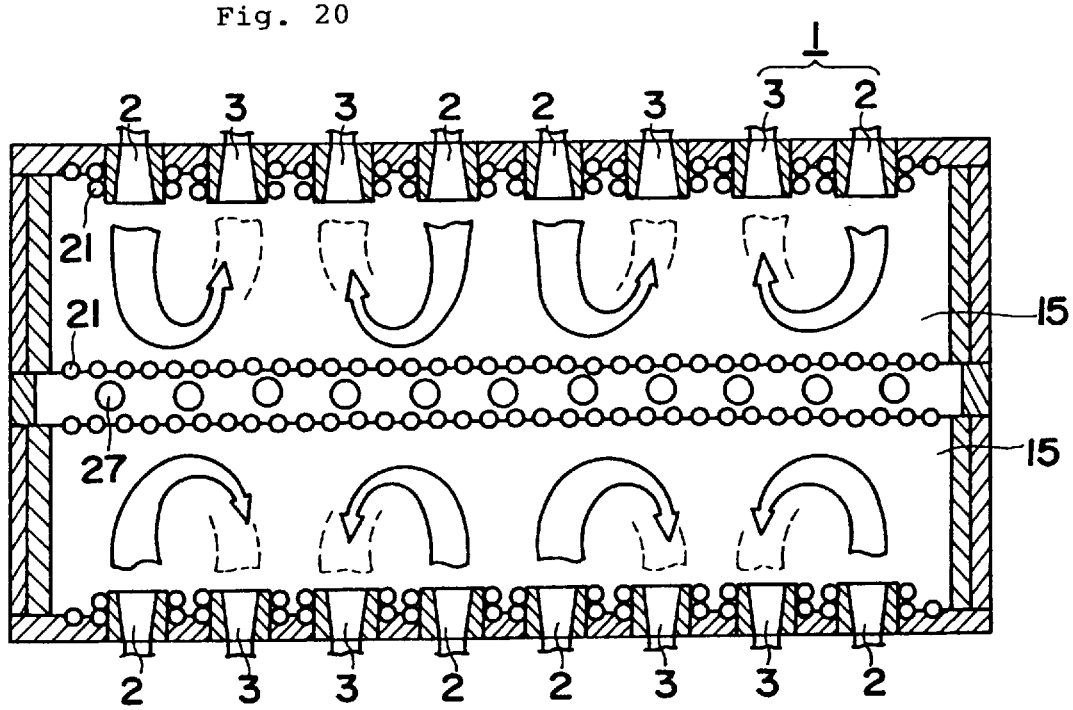
FIG. 20 is a cross-sectional view of the boiler shown in FIG. 19.

FIGS. 18 through 20 illustrate still another embodiment of the present invention. This embodiment relates to a natural-circulation-type water tube boiler capable of controlling the distribution of heat absorption of the boiler, as desired, in the radiation heat transfer section 15. According thereto, a plurality of regenerative-heating-type burner systems 1, ..., 1 are disposed in a direction wherein a water is supplied upwardly, i.e. in an axial direction of the water tubes 21, so as to form a plurality of temperature zones. In the illustrated embodiment, three temperature zones are formed. In each of the temperature zones, a pair of regenerative-heating-type burners 2, 3 are disposed abreast with another ones in a direction orthogonal to the water tubes, i.e. in a direction transversely of the water tubes 21, ..., 21, whereupon two adjoining burners constitute one unit of the regenerative-heating-type burner system 1. In the present embodiment shown, on the wall of the boiler, four units of regenerative-heating-type burner systems 1 are disposed abreast with one another in a direction transversely of the water tubes 21, and further, those four units of burner systems 1 are provided in three zones in the axial direction of the water tubes (i.e. in the vertical direction), thus defining three temperature zones in that axial direction of water tubes or in the vertical direction. With such arrangement, a combustion gas blown from one burner 2 or 3 will be inhaled into another adjoining and mating burner 3 or 2 and exhausted therefrom, which creates a flame in a horizontal direction (i.e. in the direction transversely of the water tubes 21). Hence, combustion gases generated in each of the zones are to be inhaled and exhausted at very and between two adjoining right- and left-side burners, thereby preventing the combustion gases from flowing in the vertical direction and thus substantially partitioning or restricting the flow of the gases in each of the temperature zones. It is therefore possible to control the amount of combustion in the burners in each of the temperature zones and set a desired temperature independently in each of them. This, for example, allows for setting progressively lower combustion temperatures as the temperature zones proceed towards the upstream nearer to the lower drum 25, while setting, by contrast, a highest combustion temperature in the temperature zone at the most downstream adjacent to the upper drum 26, in which case, the boiler water may be heated in a high efficient way and the combustion may be controlled to set in a high state the distribution of heat absorption rate in the whole furnace.

Figure 22:
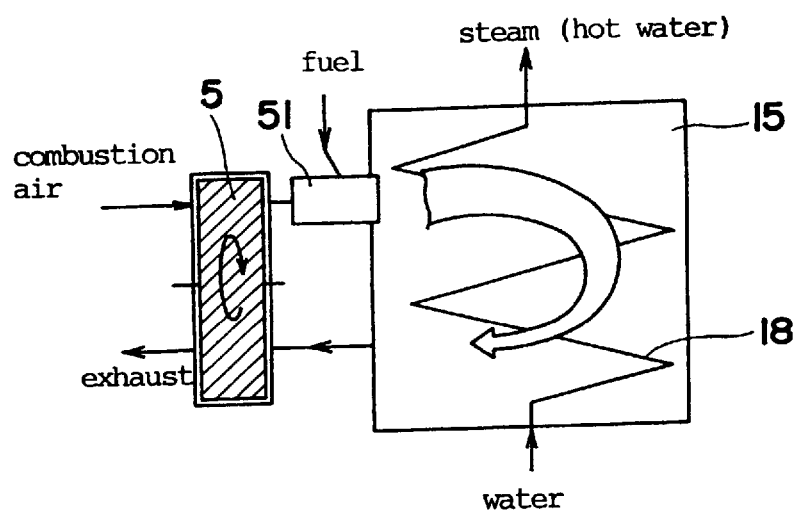
FIG. 22 is a schematic diagram which explanatorily shows another example of regenerative-heating-type burner systems.
Figure 23A:
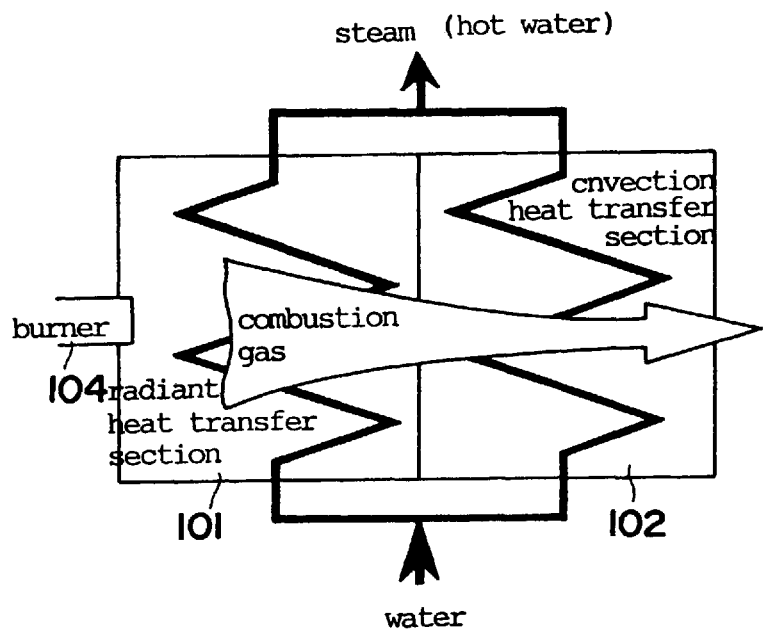
FIG. 23A is an operation principle diagram showing a conventional boiler.
Figure 23B:
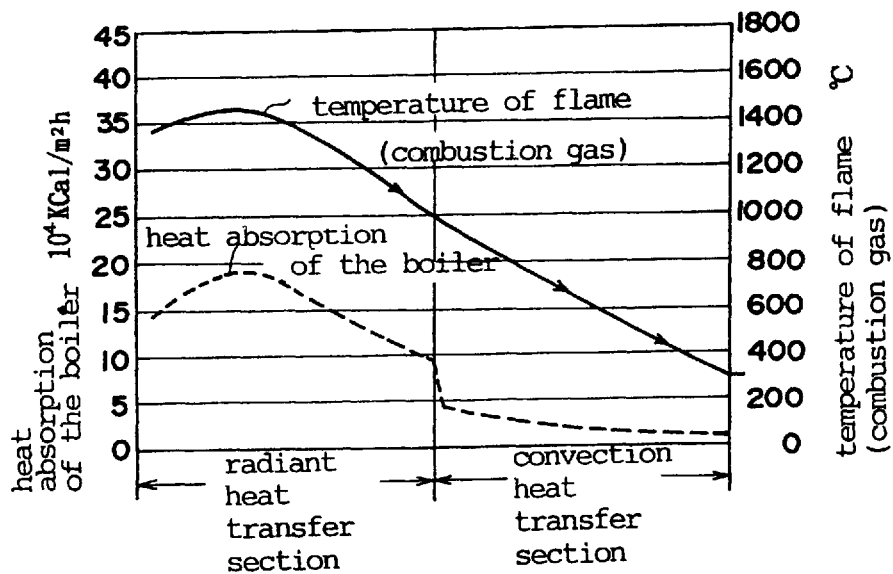
FIG. 23B is a graph showing heat absorption of the boiler in the same boiler.
Figure 24A:
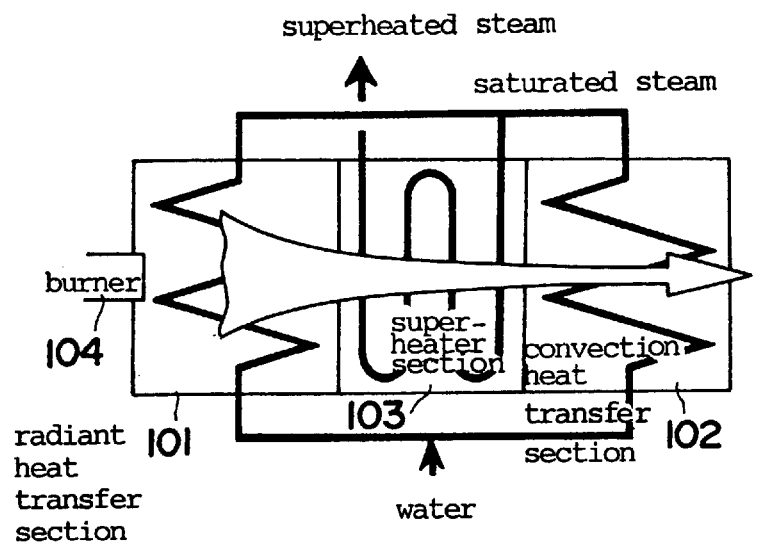
FIG. 24A is an operation principle diagram showing a conventional boiler with superheater.
Figure 24B:
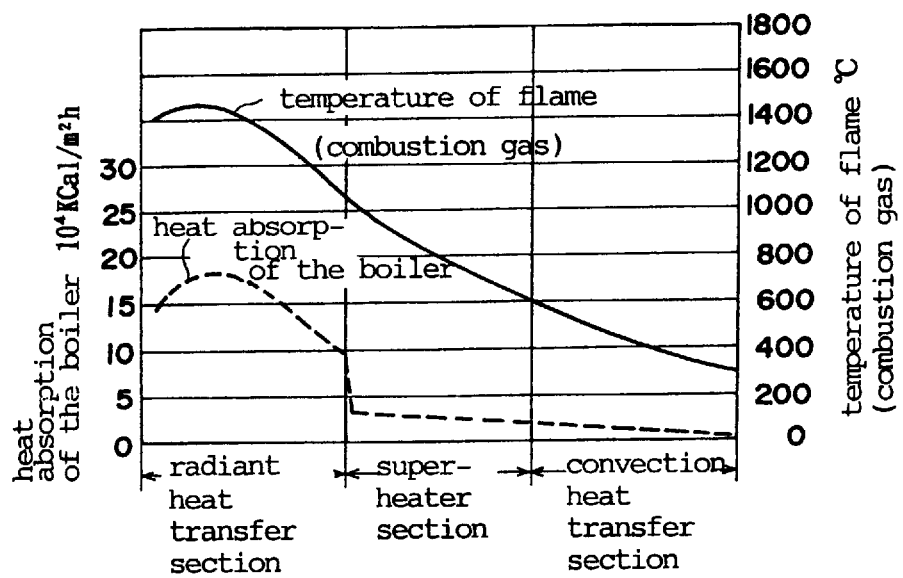
FIG. 24B is a graph showing heat absorption of the boiler in the boiler.
Figure 25A:
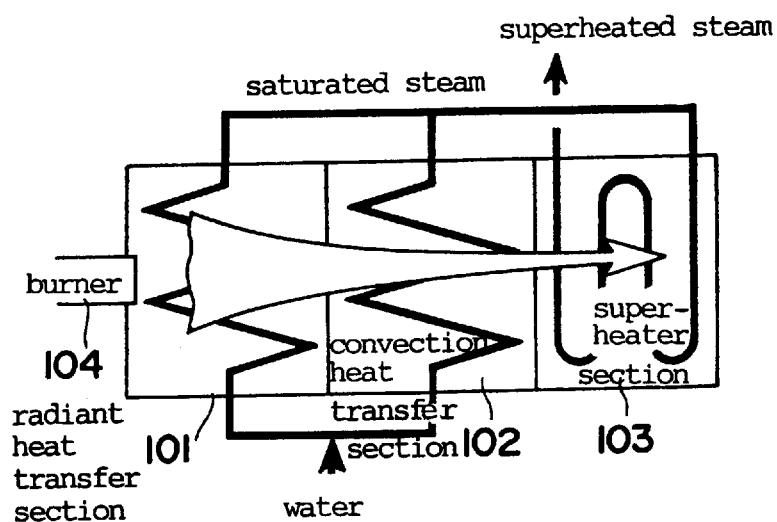
FIG. 25A is an operation principle diagram showing another conventional boiler with superheater.
Figure 25B:
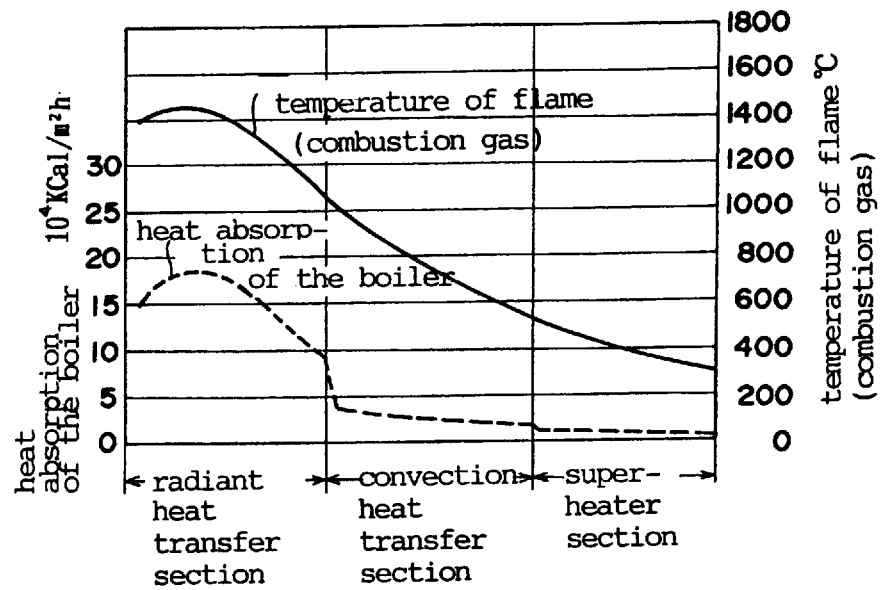
FIG. 25B is a graph showing heat absorption of the boiler in the same boiler.

Finally, it should be understood that the above-described embodiments suggest preferred modes for carrying out the present invention, and therefore, the invention is not limited to them, but other various modifications may be applied thereto without departing from the gist or scopes of the present invention. For example, the regenerative-heating-type burner system 1 described in the illustrated embodiments, which has the regenerative beds 5 fixed therein and requires alternating the direction of combustion, or precisely stated, effecting a combustion in one of the two burners alternately, to thereby change over the flow of combustion gas and air with respect to the regenerative beds 5, is not limited to this particular construction. But, the burner system may be so constructed, as shown in FIG. 22, that the passages of combustion gas and air are fixed and the regenerative bed 5 is rotatable, so that the flows of combustion gas and air may be changed relative to each other in respect of the regenerative bed 5. In addition, while the present embodiments utilize the four-way valve 11 for connecting selectively one of the combustion air supply system 7 and exhaust system 8 with the regenerative beds 5. Yet the present invention is not limited thereto but any other fluid passage change-over means, such as a spool-type fluid passage change-over valve.

The present invention is different from the prior art in the two following ways:

(1) Combustion air is pre-heated to high temperature that is more than the ignition point of the fuel (800° C. or so, for example) directly by the heat exchanger utilizing regenerator bed; and (2) The flatness of the temperature in the combustion chamber is achieved by producing forced circulation (return circulation) of combustion gas in the chamber. The flow speed needed for producing forced circulation of the combustion gas is more than 60 m/s at the time of maximum combustion, more preferable 80 m/s or 100 m/s is the most preferable at the time of maximum combustion.

Combustion air in burners for conventional boilers generally jets at the flow speed of 20–30 m/s or so. If the speed is faster than this, the flame is blown out. A speed for jetting air of regenerative-heating-type burners in the prior art has not been mentioned. Air jets at the speed of 20–30 m/s is common knowledge for combustion, however. Consequently, flatness of temperature in known furnaces does not exist but partial high temperature areas are created, and the average temperature becomes much lower than the maximum limit of the temperature since the maximum temperature in the furnace is set to be at the temperature of the high temperature area.

Figure 26:
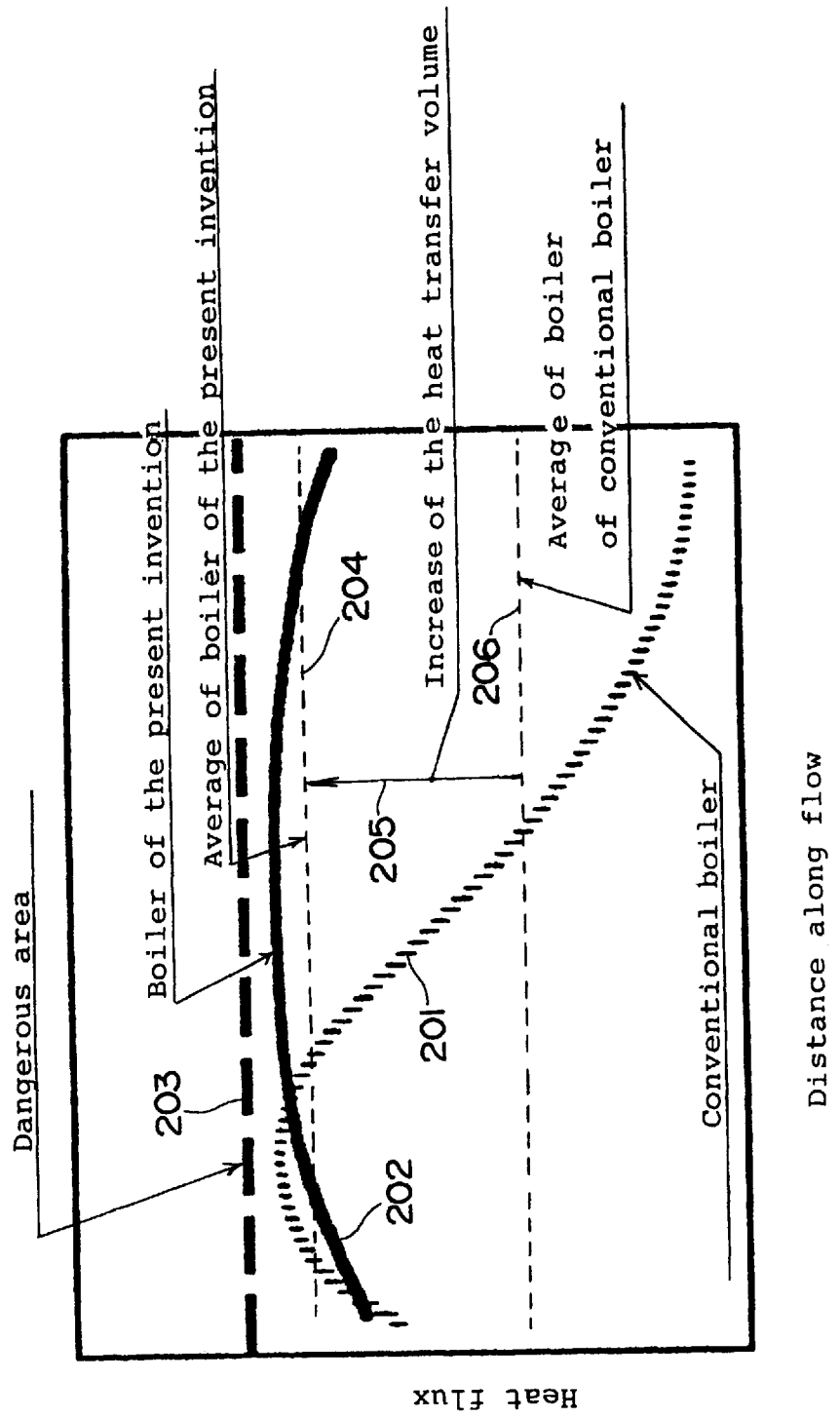
FIG. 26 is a graphic representation of the operating conditions of the present invention.

This is shown in FIG. 26, at curve 201 (conventional boiler). The flat or constant temperature of the invention across the boiler is shown at curve 202.

According to the boiler of the present invention, a flow of combustion air which is jetted into the combustion chamber at a high speed of more than 100 m/s, produces forced circulation in the combustion chamber. Further, it is not necessary to mix the fuel with the air for combustion since the temperature of the combustion air is higher than the ignition point for the fuel and the flame is stable and is not blown out because of this high temperature. In addition, a self recirculation of combustion gas and exhaust gas is made by the forced circulation produced in the combustion chamber. Accordingly, low $No_x$ due to slow combustion, becomes possible.

Further more, the forced circulation of combustion gas is produced in the combustion chamber by high speed jet flow of combustion air and the flatness or averaging the temperature in the combustion chamber is achieved. A partial, high temperature area is not produced (see FIG. 26). This enables the average temperature in the combustion chamber to be increased to the vicinity of the maximum or dangerous temperature at 203 (Tmax). Heat transfer volume is increased to level 204. The tube heating temperature difference is made small and thermal stress to the tube is thus decreased and tube life is longer as well. Tube life in a conventional boiler is reduced due to large temperature changes and resulting thermal stress.

See increase 205 of the heat transfer volume, over a conventional boiler at 206. At the same time, in the invention, when the high temperature combustion gas is exhausted through regenerator beds, the sensible heat is recovered to the regenerator, and then heat is returned to the combustion chamber after it is used for preheating the combustion air again at high thermal efficiency. this also enables the temperature of the combustion air to be high and close to the temperature of combustion exhaust gas which flows into the regenerator, and high thermal efficiency is maintained.

In addition, when each pair of burners is alternatively burned for a short time, the flame position is changed so often that the flame becomes non-constant and a greater flatness of the temperature profile is achieved.

As described above, the average temperature at 202, can be increased to the vicinity of the maximum temperature at 203 and this is possible because of the flatness of the temperature in the combustion chamber which is achieved by forced circulation of the combustion gas. Therefore, since the heat transfer volume can be increased at 205, the same evaporating volume as in conventional boiler's which has a convection heat transfer section, can be secured, even only by using the radiation heat transfer section. At the same time, since thermal recovery is made by the regenerator bed, high thermal efficiency is maintained.

What is claimed is:

1. A method of operating a boiler with increased flame temperature and output, the boiler having a combustion chamber; a radiation heat transfer section in the combustion chamber; and at least one regenerative-heating burner system connected to the combustion chamber, the regenerative-heating burner system having a pair of regenerative beds and a burner connected to each bed; the method comprising:

supplying heat combustion air through each regenerative bed and to each burner at a jet flow rate of at east 60 m/s;

supplying the combustion air with fuel to each burner system for forming a flame which produces combustion gas which is exhausted into the combustion chamber and past the radiation heat transfer section, the flame being at a first temperature and the combustion gas being at a second temperature, the combustion air having a temperature preheated to above the ignition temperature of the fuel;

causing a flow of said combustion air and flow of said combustion gas to be changed over, relative to each other, for first heating one of the regenerative beds with combustion gas passing therethrough to a temperature above the ignition temperature of the fuel, while combustion air is being supplied through the other one of the regenerative beds for being heated to above the ignition temperature of the fuel before combining with the fuel to form the flame; and heating the combustion air in the regenerative beds to above the ignition temperature of the fuel and substantially to the same temperature as said second temperature of the combustion gas, so that the first temperature of the flame is increased to increase heat transfer to the radiation heat transfer section while creating a substantially flat and high temperature across the combustion chamber.

2. A method according to claim 1, including providing in said boiler a heat exchanger which only includes said radiation heat transfer section, and extending heat recovery means through said radiation heat transfer section for absorbing heat from the boiler.

3. A method according to claim 1, including a plurality of regenerative-heating burner systems in said combustion chamber, a convection heat transfer section connected to said radiation heat transfer section for receiving at least a portion of said combustion gas which is exhausted from the boiler, a remainder of the combustion gas which is not exhausted from the boiler being recirculated to at least some of the regenerative beds of said plurality of regenerative-heating burner systems.

4. A method according to claim 3, including extending heat recovery means through at least one of said radiation heat transfer section and said convection heat transfer section, for absorbing heat from the boiler.

5. A method according to claim 1, including producing said combustion gas to have said second temperature to be about 700° to 1,000° C., by supplying said combustion air and fuel so that said first temperature of said flame is between about 1,800° to 2,000° C.

6. A method according to claim 1, including a superheater section connected to said radiation heat transfer section for receiving some of the combustion gas, passing fluid through said super-heater section for forming saturated steam, said super-heater section constructed for passing all of the exhaust gas supplied thereto from the radiation heat transfer section, out of said boiler.

7. A method according to claim 6, including controlling the amount of combustion gas passing from the radiation heat transfer section of the super-heater section, as a function of a temperature of the super-heated steam.

8. A method according to claim 1, including changing over at intervals of about 20 seconds to about 2 minutes for varying the position of the flame in the combustion chamber for increasing a flatness of the temperature level across the combustion chamber.

9. A method according to claim 8, wherein the interval is about 20 seconds to 40 seconds.

10. A method according to claim 9, including supplying the combustion air at a flow rate of above 100 m/s.

11. A method according to claim 8, including supplying the combustion air at a jet flow rate of above 80 m/s.

* * * * *